(12) United States Patent
Seo et al.

(10) Patent No.: US 9,838,188 B2
(45) Date of Patent: Dec. 5, 2017

(54) INTER-CELL INTERFERENCE COORDINATION IN A WIRELESS COMMUNICATION SYSTEM

(71) Applicant: LG ELECTRONICS INC., Seoul (KR)

(72) Inventors: Hanbyul Seo, Anyang-si (KR); Daewon Lee, Anyang-si (KR); Byounghoon Kim, Anyang-si (KR); Kijun Kim, Anyang-si (KR); Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 384 days.

(21) Appl. No.: 14/562,392

(22) Filed: Dec. 5, 2014

(65) Prior Publication Data

US 2015/0092717 A1    Apr. 2, 2015

Related U.S. Application Data

(63) Continuation of application No. 13/822,909, filed as application No. PCT/KR2011/007058 on Sep. 26, 2011.

(Continued)

(30) Foreign Application Priority Data

Sep. 5, 2011  (KR) .................... 10-2011-0089460

(51) Int. Cl.
*H04W 4/00*  (2009.01)
*H04L 5/00*  (2006.01)
(Continued)

(52) U.S. Cl.
CPC ......... *H04L 5/0073* (2013.01); *H04B 7/0682* (2013.01); *H04B 7/084* (2013.01);
(Continued)

(58) Field of Classification Search
None
See application file for complete search history.

(56) References Cited

U.S. PATENT DOCUMENTS 8,971,241 B2 * 3/2015 Palanki ............... H04B 7/2606
370/328
2006/0292989 A1 12/2006 Gerlach et al.
(Continued)

FOREIGN PATENT DOCUMENTS

CN 1882187 A 12/2006
CN 101816215 A 8/2010
(Continued)

OTHER PUBLICATIONS

U.S. Appl. No. 61/323,829; Barbieri, "Periodic CQI Reporting in a Wireless Communication Network".*
(Continued)

*Primary Examiner* — Kwang B Yao
*Assistant Examiner* — Juvena Loo
(74) *Attorney, Agent, or Firm* — Birch, Stewart, Kolasch & Birch, LLP

(57) ABSTRACT

A method and a first base station are described for setting measurement resources. Information about setting of a blank subframe of a second base station among a plurality of subframes is received. Resources are set in which a terminal will perform measurement using the information about setting of the blank subframe of the second base station. The information about setting of the blank subframe of the second base station includes a bitmap indicating blank subframes and non-blank subframes of the second base station. In addition, the resources in which the terminal will perform measurement are determined among the blank subframes indicated by the bitmap.

8 Claims, 14 Drawing Sheets

Related U.S. Application Data

(60) Provisional application No. 61/387,456, filed on Sep. 28, 2010, provisional application No. 61/415,297, filed on Nov. 18, 2010.

(51) Int. Cl.

| | | |
|---|---|---|
| *H04B 7/06* | (2006.01) | |
| *H04B 7/08* | (2006.01) | |
| *H04W 24/02* | (2009.01) | |
| *H04W 52/24* | (2009.01) | |
| *H04L 1/00* | (2006.01) | |
| *H04W 16/32* | (2009.01) | |
| *H04W 24/10* | (2009.01) | |

(52) U.S. Cl.
CPC .......... *H04L 1/0026* (2013.01); *H04L 5/0032* (2013.01); *H04W 24/02* (2013.01); *H04W 52/243* (2013.01); *H04W 16/32* (2013.01); *H04W 24/10* (2013.01)

(56) References Cited

U.S. PATENT DOCUMENTS

| | | |
|---|---|---|
| 2009/0092103 A1 | 4/2009 | Rao |
| 2009/0190528 A1 | 7/2009 | Chung et al. |
| 2010/0074209 A1 | 3/2010 | Montojo et al. |
| 2010/0220682 A1 | 9/2010 | Tao et al. |
| 2011/0081865 A1 | 4/2011 | Xiao et al. |
| 2011/0249643 A1* | 10/2011 | Barbieri ................ H04L 1/0026 370/329 |
| 2011/0275394 A1* | 11/2011 | Song ................... H04W 72/082 455/509 |
| 2011/0310802 A1 | 12/2011 | Song et al. |
| 2012/0264441 A1 | 10/2012 | Chandrasekhar et al. |
| 2016/0242012 A1 | 8/2016 | Maeda et al. |

FOREIGN PATENT DOCUMENTS

| | | |
|---|---|---|
| EP | 2 393 330 A1 | 12/2011 |
| JP | 2006-352859 A | 12/2006 |
| KR | 10-2009-0032628 A | 4/2009 |
| WO | WO 2009/120478 A2 | 10/2009 |
| WO | WO 2010/087172 A1 | 8/2010 |
| WO | WO 2011/122833 A2 | 10/2011 |

OTHER PUBLICATIONS

U.S. Appl. No. 61/382,955, filed Sep. 15, 2010.
U.S. Appl. No. 61/323,756, filed Apr. 13, 2010.
Qualcomm Incorporated, "Measurements and feedback extensions for improved operations in HetNets," 3GPP TSG-RAN WG1 #61, R1-102776, Montral, Canada, May 10-14, 2010, pp. 1/3-3/3.
Texas Instruments, "Coordinated CSI Estimation in Heterogeneous Networks," 3GPP TSG RAN WG1 #62, R1-104483, Madrid, Spain, Aug. 23-27, 2010, pp. 1-2.
U.S. Appl. No. 13/822,909, filed Mar. 13, 2013.
3GPP, "3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, v9.0.0, Mar. 2010, pp. 1-104.
U.S. Appl. No. 61/323,829, filed Apr. 13, 2010.
Catt, "Potential Problems and Performance Analysis in Time Domain Solutions to UE," 3GPP TSG RAN WG1 meeting #62, R1-104346, Madrid, Spain, Aug. 23-27, 2010 (EPO Server Date Aug. 17, 2010), 6 pages, XP-50449703A.
Huawei, "Understanding the Time Domain eICIC Schemes," 3GPP TSG RAN WG1 meeting #62, R1-104308, Madrid, Spain, Aug. 23-27, 2010 (EPO Server Date Aug. 17, 2010), 5 pages, XP-50449666A.

* cited by examiner

FIG. 6
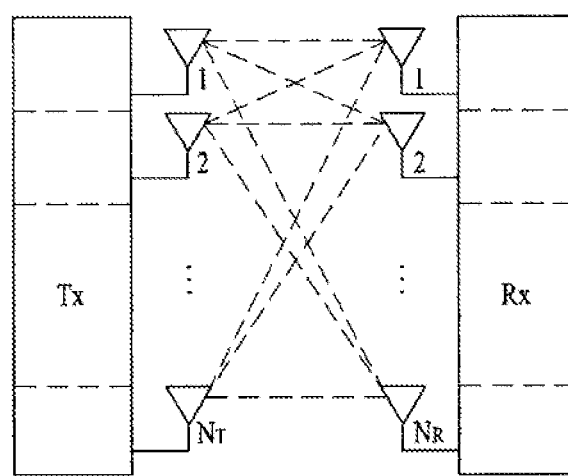
(a)
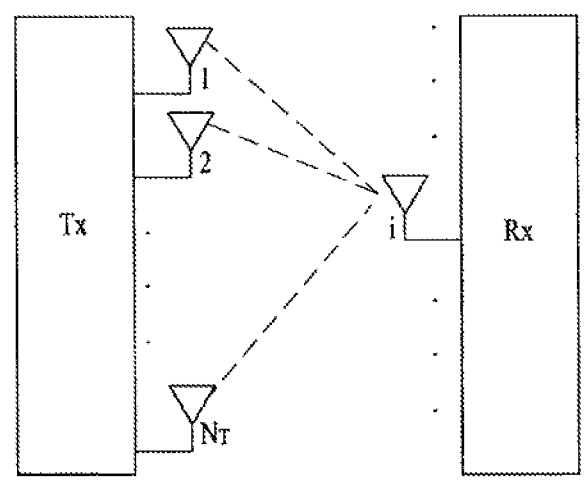
(b)

FIG. 7
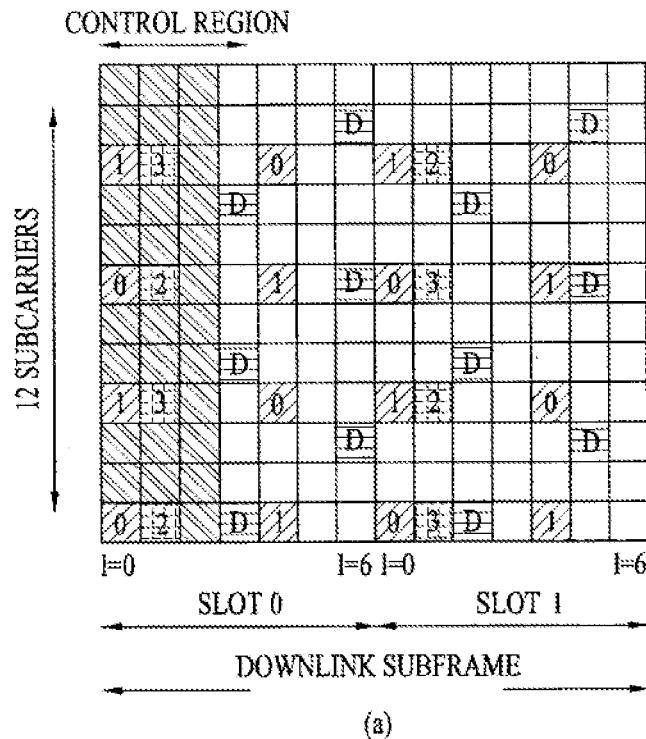
(a)
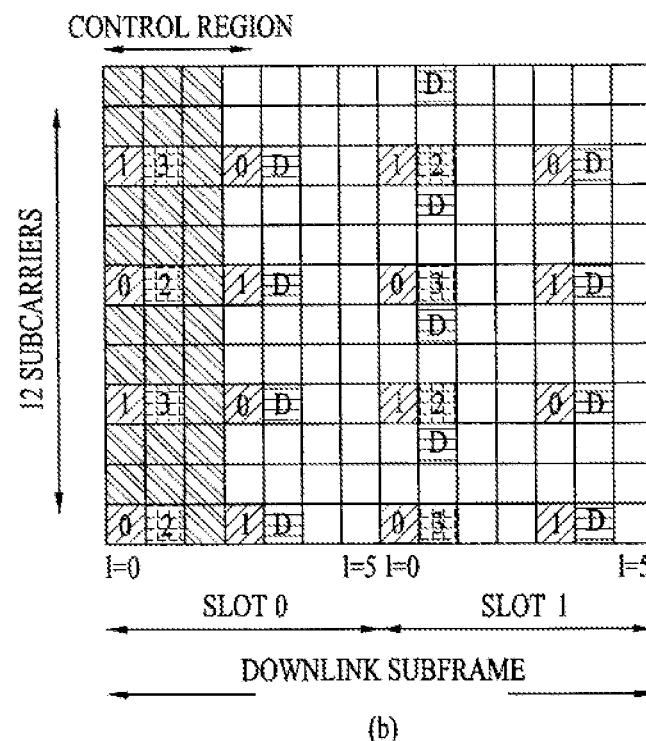
(b)

INTER-CELL INTERFERENCE COORDINATION IN A WIRELESS COMMUNICATION SYSTEM

CROSS-REFERENCE TO RELATED APPLICATIONS

This application is a continuation of co-pending U.S. patent application Ser. No. 13/822,909 filed on Mar. 13, 2013, which is the national phase of PCT International Application No. PCT/KR2011/007058 filed on Sep. 26, 2011, which claims the benefit of U.S. Provisional Application Nos. 61/387,456 filed on Sep. 28, 2010, 61/415,297 filed on Nov. 18, 2010, and Korean patent application No. 10-2011-0089460 filed on Sep. 5, 2011, the entire contents of all of the above applications are hereby incorporated by reference.

BACKGROUND OF THE INVENTION

Field of the Invention

The present invention relates to a wireless communication system, and more particularly, to a method and apparatus for coordinating and reducing inter-cell interference in a wireless communication system.

Discussion of the Related Art

FIG. 1 illustrates a heterogeneous network wireless communication system 100 including a macro base station eNB1 and a micro base station eNB2. In the description of the present invention, the term "heterogeneous network" refers to a network wherein a macro base station 110 and a micro base station 120 co-exist even when the same RAT (Radio Access Technology) is being used.

A macro base station 110 refers to a general base station of a wireless communication system having a broad coverage range (service provision area) and a high transmission power. The macro base station 110 may also be referred to as a macro cell. The micro base station 120 may also be referred to as a micro cell, a pico cell, a femto cell, a home eNB (HeNB), a relay, and so on. More specifically, the micro base station 120 corresponds to a smaller version of the macro base station 110. Accordingly, the micro base station 120 may independently perform most of the functions of the macro base station. Herein, the micro base station 120 may correspond to an overlay base station, which may be installed in an area covered by the macro base station, or to a non-overlay base station, which may be installed in a shadow area that cannot be covered by the macro base station. As compared to the macro base station 110, the micro base station 120 has a narrower coverage range and a lower transmission power and may accommodate a smaller number of terminals.

A terminal 130 may directly receive services from (or be served by) the macro base station 110 (hereinafter referred to as a macro-terminal) or may directly receive services from (or be served by) the micro base station 120 (hereinafter referred to as a micro-terminal). In some cases, a terminal 130 present within the coverage area of the micro base station 120 may receive services from the macro base station 110. FIG. 1 shows a state in which the terminal 130 is connected to the micro base station 120.

Depending upon whether or not the terminal has limited access, the micro base station may be categorized into two different types, the first type being a CSG (Closed Subscriber Group) micro base station, and the second type being an OA (Open Access) or OSC (Open Subscriber Group) micro base station. More specifically, the CSG micro base station may serve only specific terminals that are authorized, and the OSG micro base station may serve all types of terminals without any particular access limitations.

SUMMARY OF THE INVENTION

As shown in FIG. 1, if the terminal 130 served by the micro base station 120 receives a desired signal from the micro base station 120 in the heterogeneous network, interference may occur due to a strong signal from the macro base station 110. Alternatively, if the terminal served by the macro base station is adjacent to a micro base station, interference may occur in a signal received by the terminal from the macro base station due to a strong signal from the micro base station. Such interference may be referred to as inter-cell interference and the above-described example relates to inter-cell interference in downlink from a base station to a terminal. Similarly, inter-cell interference may occur in uplink from a terminal to a base station.

An object of the present invention devised to solve the problem lies in a method of transmitting and receiving a cooperative signal between cells in which interference occurs, in order to reduce inter-cell interference.

The technical problems to be solved by the present invention are not limited to the above-described technical problems and other technical problems which are not described are understood by those skilled in the art from the following description.

The object of the present invention can be achieved by providing a method of transmitting channel state information (CSI) measurement resource information by a base station, including determining first and second subframe sets, in which CSI measurement will be performed, among a plurality of downlink subframes, transmitting information indicating the first and second subframe sets to a terminal, and receiving the CSI of each of the first and second subframe sets from the terminal. Here, a subframe belonging to the first subframe set and a subframe belonging to the second subframe set do not overlap, and some of the plurality of subframes do not belong to either of the first and second subframe sets.

According to another aspect of the present invention, there is provided a method of performing channel state information (CSI) measurement by a terminal, including receiving, from a base station, information indicating first and second subframe sets, in which the CSI measurement will be performed, among a plurality of downlink subframes, performing CSI measurement with respect to each of the first and second subframe sets, and transmitting the CSI to the base station. Here, a subframe belonging to the first subframe set and a subframe belonging to the second subframe set do not overlap, and some of the plurality of subframes do not belong to either of the first and second subframe sets.

According to another aspect of the present invention, there is provided a base station for transmitting channel state information (CSI) measurement resource information, including a reception module configured to receive an uplink signal from a terminal, a transmission module configured to transmit a downlink signal to the terminal, and a processor configured to control the base station including the reception module and the transmission module. Here, the processor is configured to determine first and second subframe sets, in which CSI measurement will be performed, among a plurality of downlink subframes, transmit information indicating the first and second subframe sets to the terminal through the transmission module, and receive the CSI of each of the first and second subframe sets from the terminal through the reception module. A subframe belonging to the first subframe set and a subframe belonging to the second subframe set do not overlap, and some of the plurality of subframes do not belong to either of the first and second subframe sets.

According to another aspect of the present invention, there is provided a terminal for performing channel state information (CSI) measurement, including a reception module configured to receive a downlink signal from a base station, a transmission module configured to transmit an uplink signal to the base station, and a processor configured to control the terminal including the reception module and the transmission module. Here, the processor is configured to receive, from the base station, information indicating first and second subframe sets, in which the CSI measurement will be performed, among a plurality of downlink subframes through the reception module, perform the CSI measurement with respect to each of the first and second subframe sets, and transmit the CSI to the base station through the transmission module. A subframe belonging to the first subframe set and a subframe belonging to the second subframe set do not overlap, and some of the plurality of subframes do not belong to either of the first and second subframe sets.

The embodiments of the present invention have the following features.

The base station may determine the first and second subframe sets using information indicating a subset of blank subframes of a neighbor cell.

The first subframe set may include a subframe in which a probability of being set as a blank subframe by a neighbor cell is higher than that of the second subframe set.

According to another aspect of the present invention, there is provided a method of setting measurement resources by a first base station, including receiving information about setting of a blank subframe of a second base station among a plurality of subframes, and setting resources in which a terminal will perform measurement using the information about setting of the blank subframe of the second base station. Here, the information about setting of the blank subframe of the second base station includes first and second bitmaps, the first bitmap indicates blank subframes and non-blank subframes, and the second bitmap indicates a subset of subframes indicated as the blank subframes by the first bitmap.

According to another aspect of the present invention, there is provided a base station of a cell which is subject to interference, which sets measurement resources, including a reception module configured to receive a signal from a base station of a cell which causes interference, a transmission module configured to transmit a signal to the base station of the cell which causes interference, and a processor configured to control the base station of the cell which is subject to interference, which includes the reception module and the transmission module. Here, the processor is configured to receive information about setting of a blank subframe of the base station of the cell which causes interference among a plurality of subframes through the reception module, and set resources in which a terminal will perform measurement using the information about setting of the blank subframe of the base station of the cell which causes interference. The information about setting of the blank subframe of the base station of the cell which causes interference includes first and second bitmaps, the first bitmap indicates blank subframes and non-blank subframes, and the second bitmap indicates a subset of subframes indicated as the blank subframes by the first bitmap.

The embodiments of the present invention have the following features.

Each of the blank subframes of the second base station indicated by the first bitmap may belong to any one of a first group or a second group, the first group may include subframes indicated by the second bitmap as belonging to a subset of blank subframes, and the second group may include subframes indicated by the second bitmap as not belonging to a subset of blank subframes.

A probability of the second base station setting a subframe belonging to the first group to a blank subframe may be different from a probability of the second base station setting a subframe belonging to the second group to a blank subframe.

The probability of the second base station setting the subframe belonging to the first group to the blank subframe may be higher than the probability of the second base station setting the subframe belonging to the second group to the blank subframe.

The setting of the resources may be performed by the first base station using a subset of blank subframes of the second base station indicated by the second bitmap.

According to another aspect of the present invention, there is provided a method of transmitting information indicating resources from a first base station to a second base station, including determining a downlink subframe which cannot be used by the first base station due to inter-cell interference among a plurality of downlink subframes, and transmitting information indicating the determined downlink subframe to the second base station. Here, the first base station may be a base station of a cell which is subject to interference and the second base station may be a base station of a cell which causes interference.

According to another aspect of the present invention, there is provided a base station of a cell which is subject to interference, which transmits information indicating resources, including a reception module configured to receive a signal from a base station of a cell which causes interference, a transmission module configured to transmit a signal to the base station of the call which causes interference, and a processor configured to control the base station of the cell which is subject to interference, which includes the reception module and the transmission module. Here, the processor is configured to determine a downlink subframe which cannot be used by the base station of the cell which is subject to interference due to inter-cell interference among a plurality of downlink subframes, and transmit information indicating the determined downlink subframe to the base station of the cell which causes interference through the transmission module.

The embodiments of the present invention have the following features.

The information indicating the determined downlink subframe may be configured in the form of a bitmap.

The method may further include receiving, by the first base station, blank subframe setting information set by the second base station in consideration of the information indicating the determined downlink subframe.

The downlink subframe which cannot be used by the first base station may be determined based on a downlink measurement result from a terminal served by the first base station.

The downlink subframe which cannot be used by the first base station may be determined to be a subframe in which the strength of inter-cell interference from the second base station is higher than the strength of a signal from the first base station to the terminal served by the first base station by a predetermined threshold.

The above general description of the present invention and a detailed description thereof which will be described hereinbelow are exemplary and are for an additional description of the invention disclosed in the accompanying claims.

According to the present invention, it is possible to provide a method and apparatus for transmitting and receiving a cooperative signal between cells in which inter-cell interference occurs so as to reduce inter-cell interference.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 6 is a diagram showing the configuration of a radio communication system having multiple antennas;

FIG. 7 is a diagram showing patterns of CRSs and DRSs defined in the existing 3GPP LTE system;

DETAILED DESCRIPTION OF THE INVENTION

Figure 1:
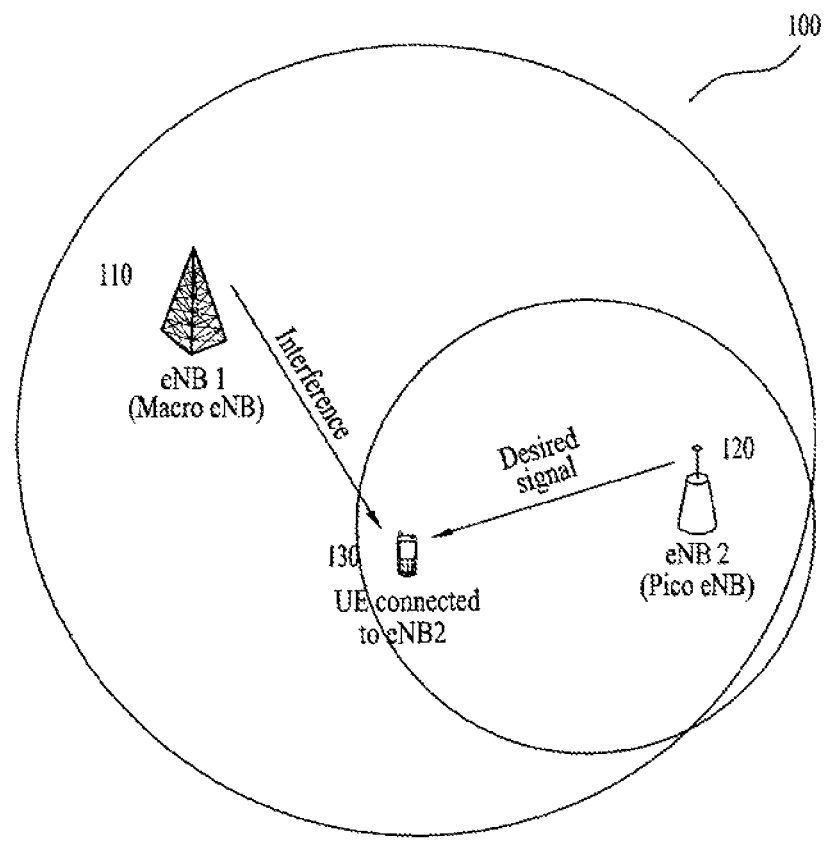
FIG. 1 is a diagram showing a heterogeneous network wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution).

The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a downlink radio frame will be described with reference to FIGS. 2(a) and 2(b).

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

Figure 2:
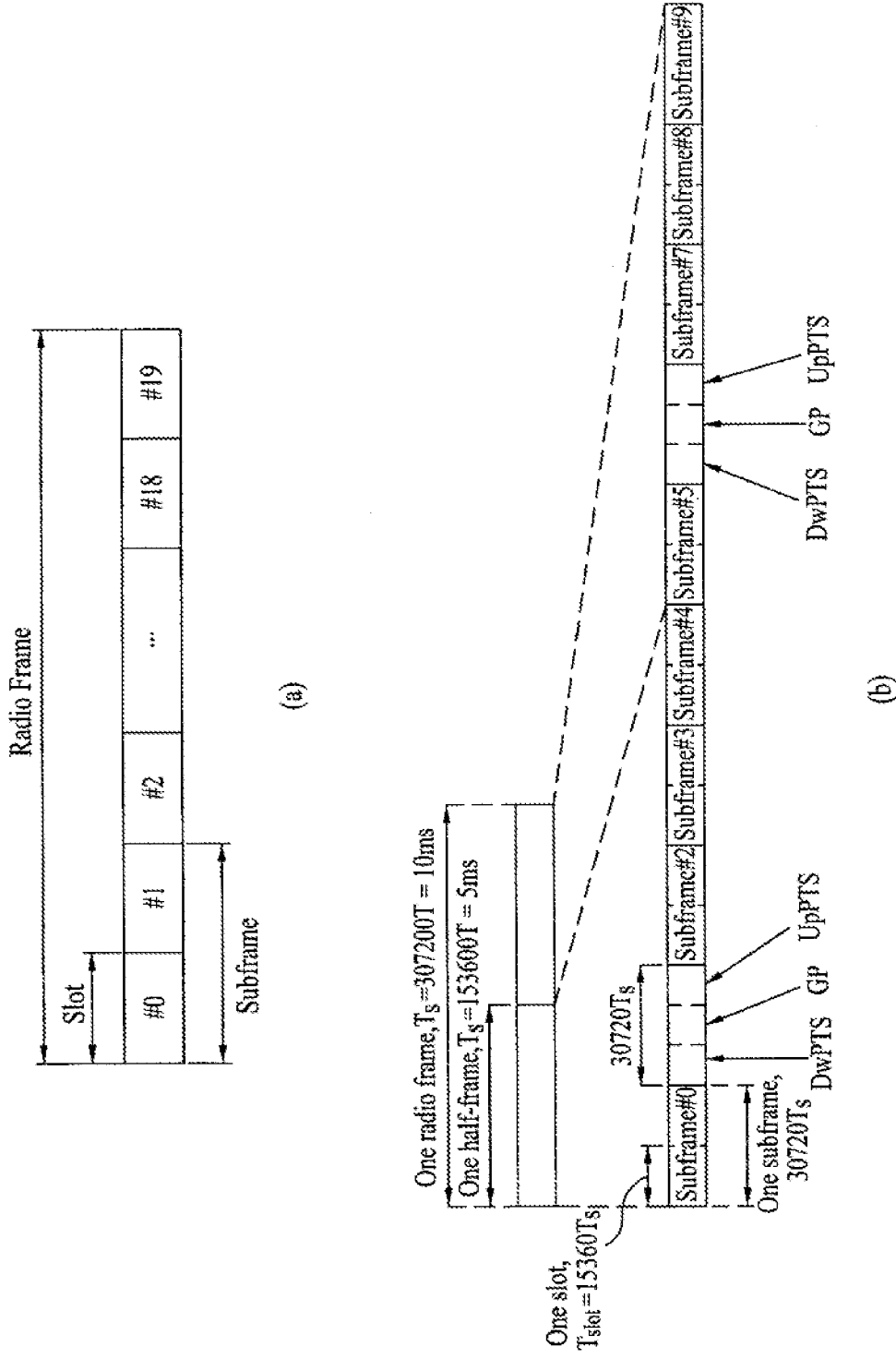
FIG. 2 is a diagram showing the structure of a downlink radio frame.

FIG. 2(a) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 3:
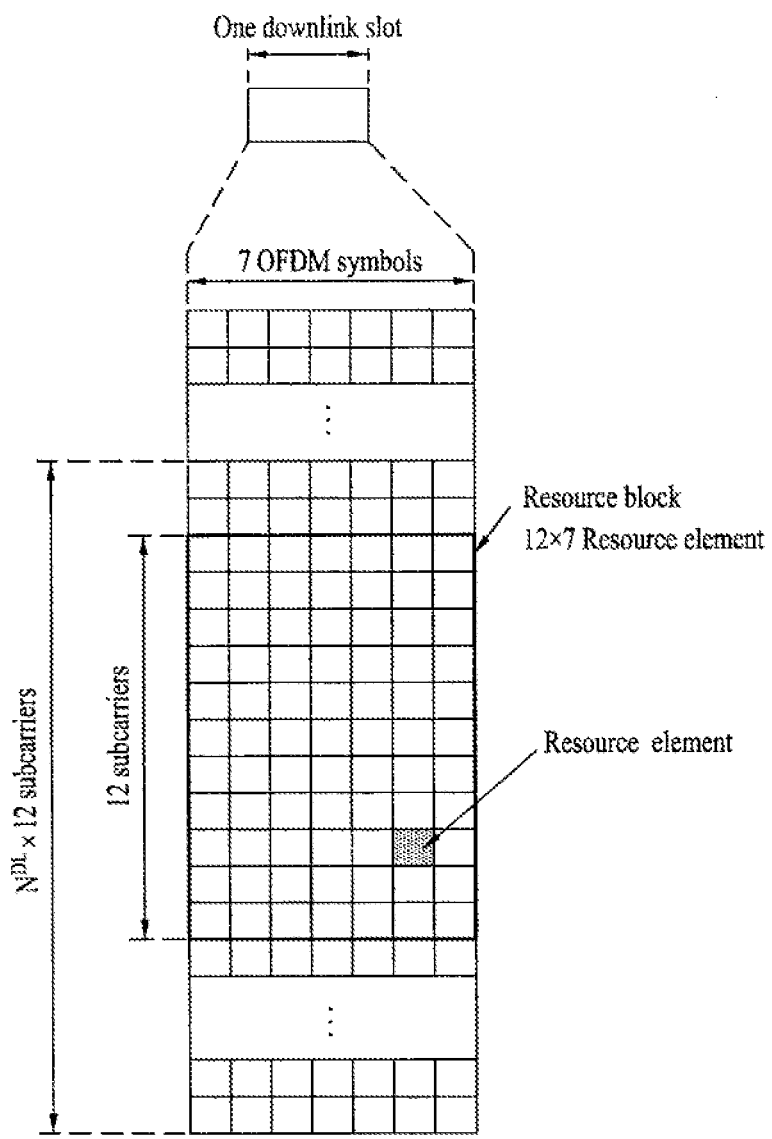
FIG. 3 is a diagram showing a resource grid in a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 4:
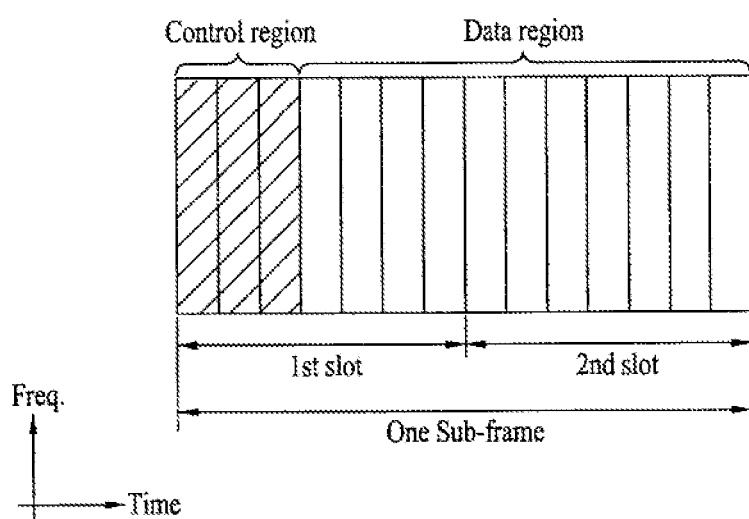
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
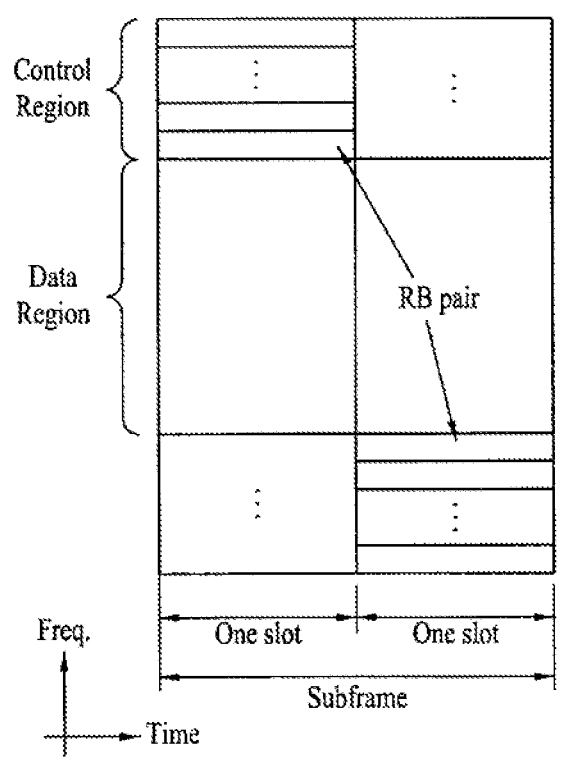
FIG. 5 is a diagram showing the structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

FIGS. 6(a) and 6(b) are diagrams showing the configuration of a radio communication system having multiple antennas.

As shown in FIG. 6(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

$$R_i = \min(N_T, N_R) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{Equation 2}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{s}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Consider that the $N_T$ actually transmitted signals $x_1, x_2, \ldots, x_{N_T}$ are configured by applying a weight matrix W to the information vector $\hat{s}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

where, $w_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 6(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

$$h_i^T = [h_{i1}, h_{i2}, \ldots, h_{iN_T}] \quad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{Equation 8}$$

An Additive White Gaussian Noise (AWGN) is added to the actual channels after a channel matrix H. The AWGN $n_1$, $n_2$, ..., $n_{N_r}$ added to the $N_T$ transmission antennas may be expressed as follows.

$$n = [n_1, n_2, \ldots, n_{N_R}]^T \quad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

$$Hx + n$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \le \min(N_T, N_R) \quad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

FIGS. 7(a) and 7(b) are diagrams showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 7(a)) and has a length of 12 OFDM symbols in case of the extended CP (FIG. 7(b)).

FIGS. 7(a) and 7(b) show the locations of the RSs on the RB pair in the system in which the eNodeB supports four transmission antennas. In FIGS. 7(a) and 7(b), Resource Elements (REs) denoted by "0", "1", "2" and "3" indicate the locations of the CRSs of the antenna port indexes 0, 1, 2 and 3, respectively. In FIGS. 7(a) and 7(b), the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Equation 12

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

Equation 13

$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

Equation 14

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to inter-Cell Interference (CI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 8:
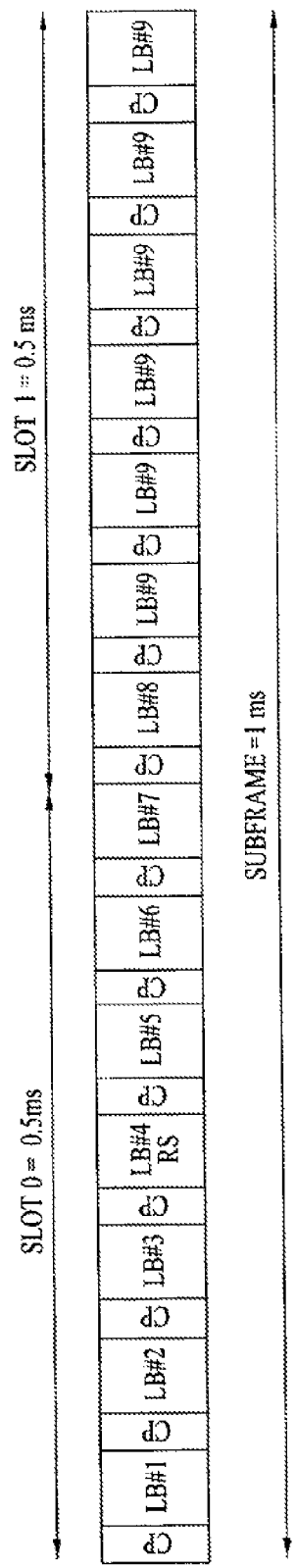
FIG. 8 is a diagram showing the structure of an uplink subframe including an SRS symbol.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bends or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
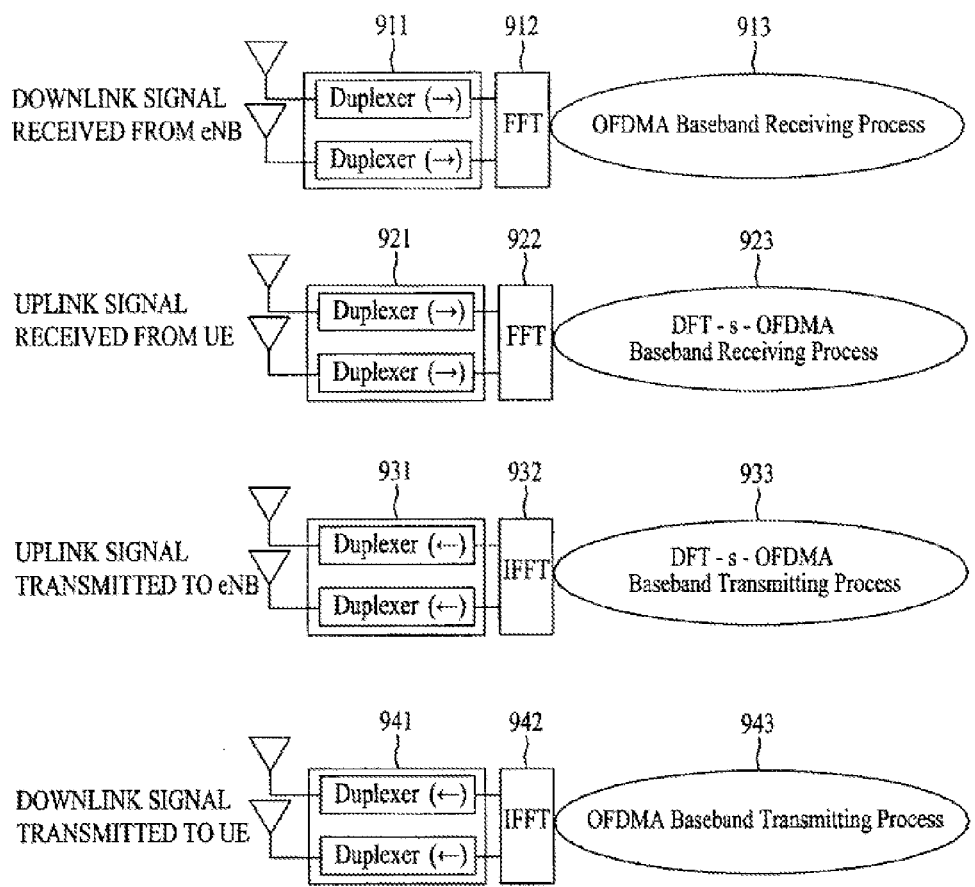
FIG. 9 is a diagram showing an example of implementing transmission and reception functions of an FDD-mode relay node (RN)

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel. RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

Figure 10:
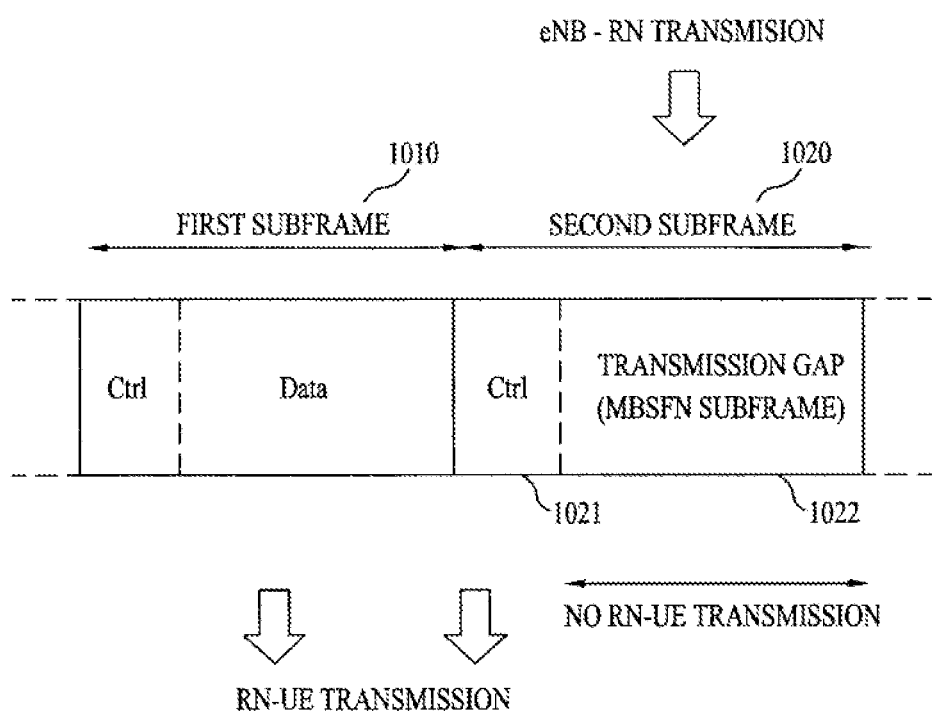
FIG. 10 is a diagram showing transmission to a UE from an RN and downlink transmission to the RN from a base station.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 10). In FIG. 10, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The MBSFN subframe is essentially used for a Multimedia Broadcast and Multicast Service (MBMS) which simultaneously transmits the same signal in the same cell. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by a R-PDCCH (Relay-PDCCH) and a R-PDSCH (Relay-PDSCH).

Reduction in Inter-Cell Interference

In the case where the coverage portions of two base stations partially overlap as in the case where two base stations eNB1 and eNB2 are adjacently arranged, interference may occur in a terminal served by one base station due to a strong downlink signal from another base station. If inter-cell interference occurs, it is possible to reduce inter-cell interference using a method of transmitting an inter-cell cooperative signal between the two base stations. In the following various embodiments of the present invention, it is assumed that a signal may be smoothly transmitted and received between two base stations in which interference occurs. For example, it is assumed that reliability for transmission and reception of a cooperative signal between base stations is high due to presence of a wired/wireless link (e.g., a backhaul link or Un interface) between two base stations with good transmission conditions such as a good transmission bandwidth or time delay. If time synchronization between two base stations is performed within an allowable error range (e.g., if a downlink subframe boundary between two base stations in which interference occurs is aligned), it is assumed that an offset of a subframe boundary between the two base stations is clearly recognized.

Referring back to FIG. 1, the eNB1 110 is a macro base station which provides services over a wide area with high transmit power and the eNB2 120 is a micro base station (e.g., a pico base station) which provides services over a narrow area with low transmit power. As shown in FIG. 1, if the terminal 130 which is located at a cell edge of the eNB2 120 and is served by the eNB2 120 receives strong interference from the eNB1 110, it may be difficult to perform efficient communication without appropriate inter-cell cooperation.

In particular, if a large number of terminals is connected to the eNB2 120 which is the micro base station with low power so as to distribute load for providing services by the eNB1 110 which is the macro base station, a probability of inter-cell interference occurring is high. For example, if a terminal sets a serving base station, a predetermined coordination (bias) value may be added to power received from the micro base station and may not be added to power received from the macro base station so as to compute and compare the received powers of the downlink signals from the macro and micro base stations. As a result, the terminal may set a base station which provides highest downlink receive power as a serving base station. Then, more terminals may be connected to the micro base station. Even when the signal from the macro base station is stronger than the signal from the micro base station in terms of the strength of the downlink signal actually received by the terminal, the micro base station may be set as the serving base station, and the terminal connected to the micro base station may experience strong interference from the macro base station. In this case, it may be difficult for terminals located at the edge of the micro base station to perform correct operations due to strong interference from the macro base station if inter-cell cooperation is not provided.

Even when inter-cell interference is present, in order to perform efficient operation, appropriate cooperation should be performed between two base stations in which inter-cell interference occurs, and a signal enabling such cooperative operation may be transmitted and received through a link between the two base stations. In this case, if inter-cell interference occurs between a macro base station and a micro base station, the macro base station may control an inter-cell cooperative operation and the micro base station may perform an appropriate operation according to a cooperative signal indicated by the macro base station.

The above-described situation in which inter-cell interference occurs is merely exemplary and the embodiments of the present invention are applicable to the case where inter-cell interference occurs in other situations (e.g., the case where inter-cell interference occurs between a CSG HeNB and an OSG macro base station, the case where a micro base station causes interference and a macro base station is subject to interference, the case where inter-cell interference occurs between micro base stations or macro base stations, etc.).

Hereinafter, for convenience of description, a cell which causes interference is referred to as an eNB1 and a cell which is subject to interference is referred to as an eNB2. It is assumed that the eNB1 is a macro base station and the eNB2 is a micro base station. However, the present invention is not limited thereto and the principle of the present invention is applicable to various forms of inter-cell interference.

As an example of coordinating inter-cell interference, a method of silencing operation which reduces the transmission power of eNB1 (including power reduction to zero transmission power) to mitigate inter-cell interference to a terminal connected to the eNB2 in a specific resource region (that is, this method may be represented by a method of transmitting a null signal or a silencing method) is applicable. As an example of a silencing operation, a cell which causes interference may configure a specific subframe by an MBSFN subframe. In a downlink subframe configured by the MBSFN subframe, a signal is transmitted only in a control region and a signal is not transmitted in a data region. As another example of a silencing operation, a cell which causes interference may configure a specific subframe by an Almost Blank Subframe (ABS) or ABS—with MBSFN. The ABS refers to a subframe in which only a CRS is transmitted in a control region and data region of a downlink subframe and the other control information and data are not transmitted. However, even in the ABS, a downlink channel and downlink signal such as a PBCH, PSS or SSS may be transmitted. The ABS-with-MBSFN refers to a subframe in which even the CRS of the data region is not transmitted unlike the above-described ABS.

The specific resource region in which silencing is performed may be represented by time resources and/or frequency resources. For example, a time resource location in which silencing is performed may be determined by a combination of at least one of an overall time domain, a specific subframe, a specific slot and a specific OFDM symbol unit. For example, a frequency resource location in which silencing is performed may be determined by a combination of at least one of an overall frequency band, a specific carrier (in case of carrier aggregation in which a plurality of carriers is used), a specific resource block and a specific subcarrier unit. The resource region in which silencing is performed is clearly specified.

The present invention proposes an inter-cell cooperative signal transmission/reception method for blanking downlink transmissions in the cell eNB1 which causes interference in a specific resource region (that is, silencing), in order to smoothly operate the terminal (UE) of the cell eNB2 which is subject to interference. Hereinafter, for convenience of description, it is assumed that specific resources in which silencing is performed are determined in subframe units. However, the range of the present invention is not limited thereto and the principle of the present invention is applicable to an operation for performing silencing in specific frequency resources between the cell eNB1 which causes interference and the cell eNB2 which is subject to interference.

Figure 11:
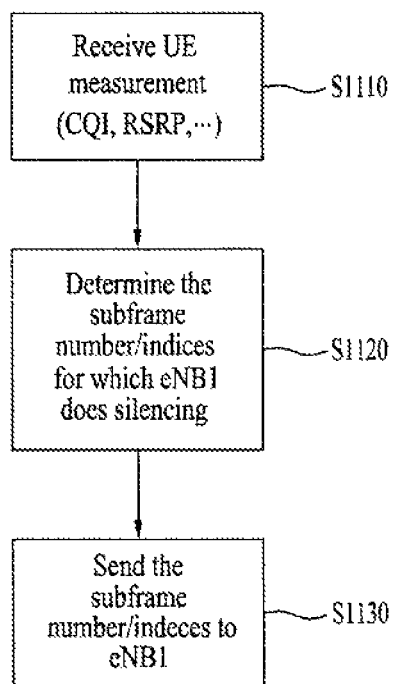
FIG. 11 is a flowchart illustrating a method of transmitting inter-cell cooperative information from a cell which is subject to interference to a cell which causes interference according to an embodiment of the present invention.

Signal Transmitted from Cell eNB2, which is Subject to Interference, to Cell eNB1, which Causes Interference FIG. 11 is a flowchart illustrating an operation S1100 for transmitting inter-cell cooperative information from the cell eNB2 which is subject to interference to the cell eNB1 which causes interference according to an embodiment of the present invention. As shown in FIG. 11, the eNB2 may determine a subframe in which a silencing operation of the eNB1 is required and inform the eNB1 of the subframe.

The present embodiment relates to a method of enabling the cell eNB2 which is subject to interference to transmit the index of a downlink subframe with strong interference to the cell eNB1 which causes interference in the form of load indication information. The eNB2 may determine a downlink subframe in which the eNB1 needs to perform silencing (that is, a subframe set to be set to a blank subframe (ABS)) and transmit information indicating the determined downlink subframe to the eNB1. The eNB1 may determine a subframe in which silencing will be performed (that is, a subframe which will be set to an ABS) and inform the eNB2 of the subframe.

More specifically, in step S1110, the eNB2 may receive, from the terminal (UE), information about downlink measurement from each base station to the terminal. The information about downlink measurement may include channel state information (CSI), radio resource management (RRM) measurement information, radio link monitoring (RLM) measurement information, etc. Then, the eNB2 may check the strength of a signal from each base station to the terminal, channel quality, link state, etc.

In step S1120, the eNB2 may determine the number/indices of subframes for requesting the eNB1 to perform silencing based on the information received in step S1110.

More specifically, the eNB2 may determine the locations and/or number of specific subframes in which the eNB1 should perform silencing (that is, subframes in which the eNB2 may provide a service to the UE without strong interference from the eNB1), based on the number and locations of UEs connected thereto and traffic load of the UEs.

The eNB2 may determine in which UE a problem occurs in reception of a control channel and/or a data channel when the eNB1 does not perform silencing. For example, the eNB2 may determine a list of UEs in which a difference between the strength of a signal received by the UE from the eNB1 and the strength of a signal from the eNB2 is greater than a predetermined threshold. Thus, the eNB2 may determine the number of subframes necessary to process all traffic for the determined UE on the assumption that interference is not caused by the eNB1. The eNB2 may determine in which subframe the eNB1 performs silencing (that is, a subframe index).

In step S1130, the eNB2 may send information about the subframe in which the silencing operation of the eNB1 is requested to the eNB1. That is, the eNB2 may transmit information specifying preferred silent subframes in which the eNB1 performs the silencing operation to the eNB1. The information specifying the subframes may be information implicitly indicating (estimating) the number of subframes, a subframe index, or the number/indices of subframes. After step S1130, the eNB1 may perform the silencing operation in consideration of the silencing subframe information sent from the eNB2.

Hereinafter, the information specifying the information sent from the eNB2 to the eNB1, that is, the subframe in which the silencing operation is requested, will be described in detail.

For example, the eNB2 may compute the preferred number of subframes in which the silencing operation of the eNB1 is requested in constant duration (e.g., four radio frames (that is, 40 subframes) units and transmit the preferred number of subframes to the eNB1. In this case, since the eNB1 may appropriately select subframes in which silencing will be performed within the duration, the operation of the eNB is not restricted.

Alternatively, the eNB2 may determine the indices (or locations) of the subframes in which the silencing operation of the eNB1 is requested and transmit the indices of the subframes to the eNB1. Transmission of the indices of the subframes in which the silencing operation will be performed indicates that the eNB1 is informed of the pattern of subframes in which silencing is desired to be performed. Thus, an inter-cell interference coordination operation (that is, silencing) may be performed to be further compatible with the operation of the UE connected to the eNB2, as compared to the case where only the number of subframes in which silencing will be performed within a predetermined duration is indicated.

For example, if a large number of UEs located at the edge of the coverage of the eNB2 use semi-persistent scheduling (SPS) of a period of 10 ms, the pattern of a subframe in which silencing is performed with the period of 10 ms may be determined and the eNB1 may be informed thereof thereby improving the effect of inter-cell interference coordination for the SPS traffics. Alternatively, if a large number of UEs located at the edge of the coverage of the eNB2 does not use SPS but uses a general HARQ scheme of a period of 8 ms, the pattern of a subframe in which silencing is performed with the period of 8 ms may be determined and the eNB1 may be informed thereof, thereby improving the effect of inter-cell interference coordination for the general HARQ processes.

The pattern of the subframe in which silencing of the eNB1 is requested, which is preferred by the eNB2, may be represented in the form of an overload indicator (OI) or a load indication for downlink. The existing OI is defined for uplink in the 3GPP LTE and is information indicating that the cell which is subject to interference informs a neighbor cell which causes interference that a specific resource region is subject to strong interference from the neighbor cell in uplink. The present invention defines the OI with respect to the downlink subframe and proposes a method of enabling the eNB2 to inform the eNB1 of the indices of specific resources (e.g., specific subframes) in which an efficient service is impossible due to strong interference from the eNB1 among resources (e.g., subframes), in which the UE connected to the eNB2 should receive a downlink service, in the form of the OI. In other words, the eNB2 may inform the eNB1 of information indicating specific resources which cannot be used by the eNB2 (that is, specific resources which are not available as resources protected from inter-cell interference) due to presence of strong interference from the eNB1 among downlink resources. This may be analyzed as a signal for enabling the eNB2 to request the eNB1 to reduce inter-cell interference with respect to a specific resource region (that is, to perform the silencing operation in a resource region indicated by the OI). Accordingly, the eNB1 may control designation of a blank subframe of the eNB1 in consideration of the OI information from the eNB2. Here, the specific resource region may be determined by a combination of time resources and/or frequency resources. For example, the OI may be sent from the eNB2 to the eNB1 in the form of a bitmap per RB.

Figure 12:
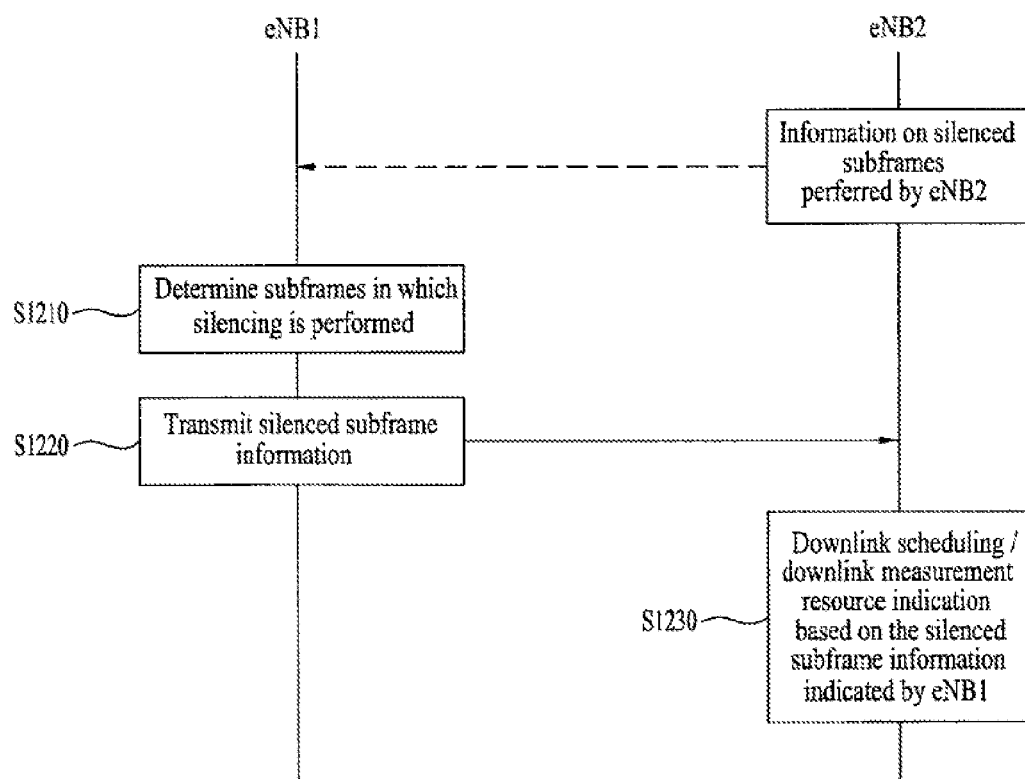
FIG. 12 is a flowchart illustrating a method of transmitting and receiving cooperative information between cells in which interference occurs according to an embodiment of the present invention.

Signal Transmitted from Cell which Causes Interference to Cell which is Subject to Interference As shown in FIG. 12, the cell eNB1 which causes interference may determine an operation which will be performed in downlink resources (S1210) and transmit information about the operation to the cell eNB2 which is subject to interference (S1220). More specifically, the eNB1 may determine information indicating in which downlink resources silencing will be performed and transmit the information to the eNB2.

The operation for enabling the eNB1 to transmit information about the resources in which silencing will be performed to the eNB2 may be transmitted as a response to information about silencing request resources received by the eNB1 from the eNB2. For example, as shown in FIG. 12, the information about silenced resources preferred by eNB2 may be transmitted from the eNB2 before step S1210, which corresponds to the result of performing the operations of S1110 to S1130 of FIG. 11 by the eNB2.

In addition, the information specifying resources in which the eNB1 will perform silencing may be determined based on information specifying resources in which the silencing operation of the eNB1 is requested, which is received from the eNB2, as described above. Determining resources in which the eNB1 performs silencing based on the silencing request resource information from the eNB2 may include enabling the eNB1 to use the silencing request information from the eNB2 or enabling the eNB1 to appropriately determine resources in which silencing will be performed (the silencing operation of the eNB1 may not be performed in the resources in which the eNB2 requests the silencing operation) in consideration of the silencing request information from the eNB2.

Alternatively, even when the silencing request resource information from the eNB2 is not present, the eNB1 may specify resources in which the eNB1 may perform silencing and inform cells which are subject to interference of neighbors of the resources in which the eNB may perform silencing. That is, in FIG. 12, a step of receiving, by the eNB1, the silencing resource information from the eNB2 is not performed before step S1210 and only step S1210 may be performed.

In either case, the cell (e.g., eNB2) which receives the information about the resources in which the eNB1 will perform silencing may schedule downlink transmission to terminals connected thereto in specific resources in which interference from the eNB1 is not present (or is low) based on the information or operate in a manner of indicating resources (subframes) in which downlink measurement will be performed in consideration of presence/absence of interference (or severity of interference) (step S1230). An example in which the eNB2 indicates subframes in which downlink measurement will be performed to the terminals connected thereto will be described subsequent to the description of the present embodiment.

Although the case in which the resources in which silencing will be performed are determined in subframe units is described, the scope of the present invention is not limited thereto and silencing may be performed in predetermined time-frequency resource units.

As an example of a method of transmitting silencing-associated information from the eNB1 to the eNB2, the eNB1 may inform the eNB2 of the indices of the subframes in which silencing will be performed. For example, the eNB1 may transmit a downlink low interference indicator (LII) to the eNB2 with respect to each subframe. Setting LII to 1 with respect to a certain subframe indicates that the eNB1 performs the silencing operation in the subframe so as to secure low inter-cell interference. Setting LII to 0 with respect to a certain subframe indicates that the eNB1 may not secure low inter-cell interference in the subframe.

This scheme can be efficient when the eNB1 can accurately predict traffic load. That is, if information indicating in which downlink subframe the silencing operation will be performed is provided in advance, the eNB1 performs the silencing operation according to the provided information so as to prevent the eNB2 from being subject to interference. Accordingly, it is possible to accurately control interference according to a predetermined agreement between the cells eNB1 and eNB2 in which interference occurs.

The above-described scheme may inefficiently use resources when the eNB1 may not accurately predict traffic load thereof. For example, in the case where the eNB1 informs the eNB2 that silencing will be performed in some subframes in advance, even when the traffic load of the eNB1 is reduced more than expected and thus silencing may be performed in more subframes than the number of subframes reported in advance, the eNB2 is unaware of information about the operation of the eNB1 in the subframes other than the subframes reported to the eNB2 that silencing will be performed. Accordingly, even when silencing is possible in the subframes other than the subframes reported in advance, the eNB1 may not perform the silencing operation in the subframes other than the subframe reported in advance. Accordingly, resource use efficiency may be deteriorated. In this case, although the eNB may inform the eNB2 of newly determined silencing subframes based on the changed traffic load, time delay may occur due to transmission and application of the new information. Accordingly, this scheme may not be immediately (or dynamically) used according to traffic load changes.

As a method of solving this problem, the present invention proposes a method of grouping, by the eNB1, subframes according to silencing priority and informing, by the eNB1, the eNB2 of information about the subframe group according to the priority.

Figure 13:
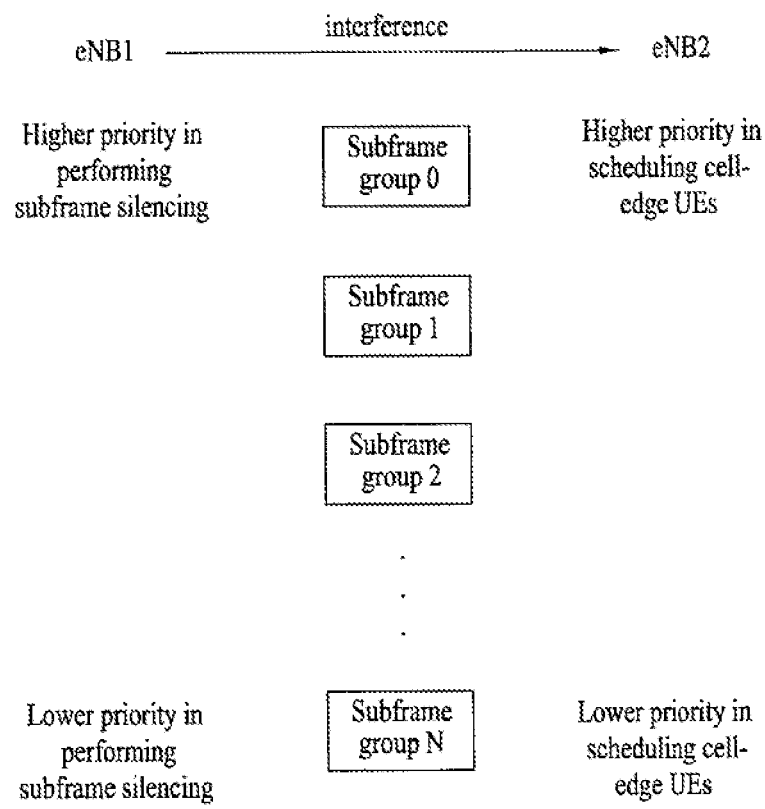
FIG. 13 is a diagram showing an example of setting a subframe group.

FIG. 13 is a diagram showing an example of configuring a subframe group according to silencing priority. As shown in FIG. 13, the eNB1 may configure the subframe group and inform the eNB2 of subframe group setting (corresponding to S1220 of FIG. 12), and the eNB2 may perform downlink scheduling or indicate resources in which downlink measurement of the terminal will be performed based on the subframe group setting information (corresponding to S1230 of FIG. 12).

For example, a subframe group 0 includes a set of subframe(s) in which silencing is necessarily performed, a subframe group 1 includes a set of subframe(s), silencing priority of which is lower than that of the group 0, and subframe groups 2 to N may be similarly determined according to silencing priority. That is, as the index of the subframe group is decreased (approaches 0), a probability of the eNB1 performing silencing is increased. As the index of the subframe group is increased (approaches N), a probability of the eNB1 not performing silencing is increased. In other words, the eNB1 may perform silencing with a probability close to 1 in the subframe group 0 and perform downlink transmission with a probability close to 1 in the subframe group N. The subframe groups 1 to N−1 may be soft cooperative silencing subframes in which the eNB1 stochastically performs silencing. As the index of the subframe group is increased, a probability of silencing being performed is decreased.

In the case where the subframe groups are set according to silencing priority, the eNB1 may preferentially perform silencing in all subframes of the subframe group 0 and may perform silencing in the subframes of the subframe group 1 if additional silencing becomes possible due to traffic load changes, etc. A determination as to whether or not the silencing operation of the eNB1 is performed in the subframe groups 2 to N may be made in a similar manner.

The eNB2 may use the subframe group information in downlink scheduling of the terminals connected thereto. For example, the eNB2 may preferentially select subframes belonging to the subframe group 0 and perform downlink scheduling with respect to terminals which require silencing of the eNB1 due to strong interference from the eNB1 (e.g., terminals located at the cell edge). Additionally, with respect to terminals which additionally require silencing of the eNB1, subframes belonging to the subframe group 1 may be selected so as to perform downlink scheduling. In a similar manner, subframes belonging to the subframe groups 2 to N are sequentially selected such that the eNB2 may perform downlink scheduling with respect to the terminals connected thereto. That is, subframes which may be scheduled to the terminals which require silencing of the eNB1 by the eNB2 may be selected in ascending order of the indices of the subframe groups.

As described above, as an example of a method of setting the subframe group according to silencing priority, the case in which the eNB1 sets the subframes to two groups will be described. Subframe(s) in which a probability of performing silencing in the eNB1 is high are set to a first subframe group and subframe(s) in which a probability of not performing silencing in the eNB1 is high may be set to a second subframe group. The eNB1 may inform the eNB2 of such subframe group setting and then the eNB2 may determine in which subframe the eNB1 performs silencing (that is, whether interference of the eNB1 is high or low). Accordingly, the eNB2 may not perform downlink scheduling with respect to the terminals connected to the eNB2 in subframes in which the interference of the eNB1 is high, thereby coordinating interference.

The first subframe group (subframes in which the eNB1 will perform silencing) may correspond to the subframe groups 0 to N−1 in the example of FIG. 13 and the second subframe group (subframes in which a probability of not performing silencing in the eNB1 is high) may correspond to the subframe group N in the example of FIG. 13.

In other words, the eNB1 may transmit a downlink high interference indicator (HII) to the eNB2. That is, a subframe in which the HII is set to 1 corresponds to the second subframe group (e.g., the subframe group N of FIG. 13) and indicates that a probability of the eNB1 causing high inter-cell interference in the subframe is high. Alternatively, a subframe in which the HII is set to 0 corresponds to the first subframe group (e.g., the subframe group 0 to N−1 of FIG. 13) and indicates that the eNB1 causes low inter-cell interference in the subframe (alternatively, indicates that high inter-call interference is not caused as in the subframe in which the HII is set to 1).

The LII and the HII may be selectively or complementarily applied.

For example, when using the LII, the number of subframes in which a probability of (necessarily) performing silencing in the eNB1 is high is generally small. In this case, operation of the eNB1 may be restricted to only silencing in a subframe in which LII=1 is set and the eNB1 may operate without limitation in the other subframes (that is, subframes in which LII=0 is set). Accordingly, it is possible to increase a degree of freedom of the operation of the eNB1 which causes interference.

In contrast, in case of using the HII, a subframe in which a probability of not performing silencing in the eNB1 is high (that is, the eNB1 will perform downlink transmission) may be specified. In this case, the downlink scheduling of the eNB2 may be restricted in a subframe in which HII=1 is set and the eNB1 may operate without limitation in the other subframes (that is, subframes in which HII=0 is set). Accordingly, it is possible to increase a degree of freedom of the operation of the eNB2 which is subject to interference.

In case of using both the LII and the HII, a subframe in which interference of the eNB1 is low (that is, which is used by the eNB2 for downlink scheduling) and a subframe in which interference of the eNB1 is high (that is, which is not used by the eNB2 for downlink scheduling) may be clearly determined. In a subframe in which LII=0 and HII=1 are set, the two cells in which interference occurs may operate without limitation.

In the example of setting the subframe group shown in FIG. 13, the example of complementarily using the LII and the HII will be described in greater detail. Subframes belonging to the subframe group index 0 (subframes with highest silencing priority or subframes with lowest interference) are denoted by LII="1" and subframes belonging to the other subframe groups (subframe groups 1 to N) may be denoted by LII="0". Alternatively, subframes belonging to the subframe group index N (subframes with lowest silencing priority or subframes with highest interference) are denoted by HII="1" and subframes belonging to the other subframe groups (subframe groups 0 to N−1) may be denoted by HII="0". In this case, the subframes corresponding to the subframe group indices 1 to N−1 do not belong to the subframes with highest interference and do not belong to the subframes with lowest interference. The subframe group with LII="1" and the subframe group with HII="1" do not overlap. That is, in case of using both the LII and the HII, a certain subframe belongs to any one of a subframe group with lowest interference, a subframe group with highest interference or the remaining subframe group.

Although the method of setting the subframe group according to the silencing priority of the cell which causes interference is described on the assumption that the case in which the silencing priority is increased as the index of the subframe group is decreased, the subframe group may be set using an opposing method. That is, the index of the subframe group may be increased as the silencing priority is increased. Even in this case, as described above, a subframe in which a probability of the cell which causes interference performing silencing is high may be indicated to neighbor cells using the LII and/or HII.

Method of Indicating Subframe Group

If the subframe group is set according to silencing priority as described above, the same channel state and interference degree may be expected within one subframe group. If a plurality of subframe groups is present, subframes belonging to each of the plurality of subframe groups needs to be reported. The present invention proposes a method of sending subframe group setting information. More specifically, the cell (eNB1) which causes interference may inform the cell (eNB2) which is subject to interference of subframe group setting information, and the cell (eNB2) which is subject to interference may send the information to the terminals served by the cell (eNB2).

First, such information may be transmitted and received between the cells, in which interference occurs, through an X2 interface (or a backhaul link), and information indicating which subframe belongs to which subframe group may be expressed in a bitmap manner. In case of the X2 interface, since restriction of signaling overhead is low, system performance is not deteriorated even when the size of transmitted information is large.

In the transmission of the subframe group setting information from the cell, which is subject to interference, to the terminal, system performance is deteriorated as signaling overhead is increased. Thus, there is a need for a method of efficiently transmitting information. Hereinafter, the method of transmitting the subframe group setting information will be described in detail.

For example, in inter-cell interference coordination in a heterogeneous network (HetNet), a heterogeneous network of a macro cell and a pico cell and a heterogeneous network of a macro cell and a femto cell may be considered. An enhanced inter-cell interference coordination (eICIC) scheme has been discussed as a method for solving a problem in that the strength of inter-cell interference is greater than the strength of a signal of a serving cell. As a representative eICIC scheme, a method of setting a specific subframe to an ABS by a cell which causes interference so as to reduce interference with another cell may be considered. The cell which causes interference may transmit information (that is, ABS information) about the subframe which is set to the ABS to the cell which is subject to interference. In this case, the terminal of the cell which is subject to interference performs measurement of a downlink channel in the subframe which is set to the ABS in the cell which causes interference, thereby reducing the influence of interference. For the measurement operation of the terminal, the cell which causes interference may transmit information about ABS setting to the cell which is subject to interference through an X2 interface and the eNB of the cell which is subject to interference may signal information about measurement which will be performed by the terminal on a per subframe basis to the terminal.

The method of transmitting information about a subframe pattern will now be described in detail. The eNB of the cell which causes interference may signal two bitmaps to the eNB of the cell which is subject to interference through the X2 interface. Each bitmap may include 40 bits and express the attribute of each subframe in units of 40 subframes. Among others, one bitmap (first bitmap) represents information indicating a subframe which is currently set to the ABS although being differently set in the future (or information indicating a subframe which is not currently set to the ABS and may not be set to the ABS in the future). Another bitmap (second bitmap) represents a subframe in which a possibility of changing ABS setting is low. In other words, the first bitmap may correspond to a bitmap in which the ABS subframe is set to "1" and the other subframes are set to "0". A second bitmap may correspond to a bitmap indicating a subframe in which a probability of being set to an ABS is high in the first bitmap (that is, a subframe which is necessarily set to an ABS in the second bitmap may correspond to a subset of subframes which are set to an ABS in the first bitmap).

In other words, the first bitmap corresponds to information indicating subframes in which silencing priority of the cell (eNB1) which causes interference is relatively low (that is, silencing is performed but silencing probability is relatively low) and the second bitmap corresponds to information indicating subframes in which silencing priority of the cell (eNB1) which causes interference is relatively high (that is, a probability of silencing being performed is high). In this case, a subframe which does not correspond to the ABS in the first bitmap may correspond to a subframe in which a probability of interference occurring is high. In association with the above-described embodiments, a subframe in which LII="1" is set may correspond to a subframe in which a probability of being set to an ABS is high in the second bitmap. A subframe in which HII="1" is set may correspond to a subframe other than a subframe which is set to an ABS in the first bitmap. A subframe in which LII="1" is not set and HII="1" is not set may correspond to a subframe which is set to an ABS in the first bitmap and in which a probability of being set to the ABS is low.

The eNB of the cell which is subject to interference may select subframes in which the terminal should perform measurement based on the information about the subframe pattern received through the X2 interface and transmit the information about a subframe set, in which the terminal will perform measurement, to a terminal which requires measurement restriction among terminals within the cell. The reason why measurement restriction is necessary is because an accurate measurement result cannot be obtained when the terminal performs measurement using the same method in both a subframe with high interference (e.g., a subframe which is not set to an ABS in the cell which causes interference) and a subframe with low interference (e.g., a subframe in which a probability of being set to an ABS is high in the cell which causes interference) and thus downlink measurement should be performed using different methods according to presence/absence of interference (or severity of interference). Then, it is possible to accurately measure an actual channel state. For the measurement operation of the terminal, the eNB of the cell which is subject to interference may transmit the information about the subframe set to be measured to the terminal through radio resource control (RRC) signaling.

The number of subframe patterns transmitted to the terminal through RRC signaling is 3. One subframe pattern is associated with radio resource management (RRM)/radio link monitoring (RLM) measurement. RRM measurement may include reference signal received power (RSRP), reference signal received quality (RSRQ), a received signal strength indicator (RSSI), etc. RLM measurement may include measurement for detection of radio link failure (RLF) such as downlink control signal reception impossibility or received signal quality deterioration. A terminal which receives a subframe pattern associated with RRM/RLM measurement may perform RRM/RLM measurement using a reference signal (e.g., a CRS, etc.) transmitted in the subframe. The remaining two subframe patterns transmitted to the terminal through RRC signaling are associated with channel state information (CSI) measurement. The terminal which receives the subframe patterns associated with CSI measurement may perform CSI measurement (RI, PMI, CQI measurement/computation) using a reference signal (e.g., a CSI-RS, etc.) transmitted in the subframe. At this time, the two subframe patterns associated with CSI measurement may include a pattern indicating a subframe with high interference (e.g., a subframe in which the cell which causes interference does not perform silencing) and a pattern indicating a subframe with low interference (e.g., a subframe in which a probability of the cell which causes interference performing silencing is high).

Each subframe pattern is signaled with a period of 40 ms and information indicating one subframe pattern has a size of 40 bits. The length of one subframe is 1 ms and a subframe pattern of units of 40 subframes may be indicated by 40 bits. In order to signal three subframe patterns, signaling overhead of a total of 120 bits (40 bits×3) occurs. Each subframe pattern which is signaled from the cell, which is subject to interference, to the terminal is shown in Table 1.

TABLE 1

| Classification | Name | Content | Size |
| --- | --- | --- | --- |
| CSI measurement associated subset | CSI_Subset1 | Subframe with low interference | 40 bits |
| | CSI_Subset2 | Subframe with high interference | 40 bits |
| | Complementary subset | Subframe which does not belong to CSI_Subset1 and CSI_Subset2 | 0 (not signaled) |

TABLE 1-continued

| Classification | Name | Content | Size |
|---|---|---|---|
| RRM/RLM measurement associated subset | RRM/RLM subset | RRM/RLM measurement subframe | 40 bits |

In Table 1, the subframe patterns associated with CSI measurement (that is, a subset including CSI measurement associated subframes among all subframes) may be classified into CSI_Subset1, CSI_Subset2 and a Complementary subset.

CSI_Subset1 is information indicating a subframe with low interference and has a size of 40 bits. CSI_Subset2 is information indicating a subframe with high interference and has a size of 40 bits. CSI_Subset1 and CSI_Subset2 may be set so as not to overlap. Although the case in which CSI_Subset1 indicates a subframe with low interference and CSI_Subset2 indicates a subframe with high interference is described, the subframes indicated by CSI_Subset1 and CSI_Subset2 may have different interference characteristics.

The complementary subset includes subframes which do not belong to both CSI_Subset1 and CSI_Subset2. Since the complementary subset is determined from CSI_Subset1 and CSI_Subset2, the complementary subset does not need to be signaled. In a subframe which is determined to belong to the complementary subset, the terminal does not perform measurement and the base station does not require a measurement result. That is, a certain subframe belongs to any one of CSI_Subset1, CSI_Subset2 or Complementary subset.

Setting of CSI_Subset1, CSI_Subset2 or the complementary subset may be determined based on information (ABS information) associated with a silenced subframe which is received by the cell, which is subject to interference, from the cell which causes interference through the X2 interface. As described above, the ABS information may include a first bitmap (indicating a subframe which is set to an ABS and a subframe which is not set to an ABS) and a second bitmap (indicating a subframe in which a probability of being set to an ABS is high among ABS subframes). For example, CSI_Subset1 may correspond to a subframe in which a probability of being set to an ABS is high in the second bitmap (or a subframe in which LII="1" is set). CSI_Subset2 may correspond to a subframe other than an ABS (or a subframe in which HII="1" is set) in the first bitmap. The complementary subset may correspond to the other subframes (a subframe which is set to an ABS in the first bitmap and in which a probability of being set to an ABS is relatively low or a subframe in which LII="1" and HII="1" are not set).

RRM/RLM_Subset is information indicating a subframe in which the terminal will perform RRM/RLM measurement and has a size of 40 bits. Since RRM/RLM measurement is for signal strength measurement, RLF detection, etc., RRM/RLM_Subset for accurate measurement may include subframes with low interference from the cell which causes interference (subframes in which low interference is guaranteed).

As shown in Table 1, signaling overhead of a total of 120 bits occurs in transmission of the CSI measurement subframe pattern and the RRM/RLM measurement subframe pattern. Thus, it is necessary to reduce control signaling overhead so as to efficiently use downlink transmission resources. The present invention proposes a method of reducing the number of bits necessary to signal subframe patterns through a combination of the above-described subframe patterns.

Among the subframe subsets described in Table 1, CSI_Subset1 and RRM/RLIM_Subset may be regarded as subframes having similar properties, because they are set to ABSs by the cell which causes interference and are subframes in which dominant interference is barely present. When RRM/RLM measurement is compared with CSI measurement, a portion necessary for RRM/RLM measurement (a portion to be measured) is relatively longer than a portion necessary for CSI measurement and an RRM/RLM measurement interval (interval between a measurement operation and a next measurement operation) is relatively longer than a CSI measurement interval. Accordingly, RRM/RLM_Subset may be included in CSI_Subset1.

In this case, one subframe may be represented by four states, that is, (1) a state in which the subframe belongs to both CSI_Subset1 and RRM/RLM_Subset, (2) a state in which the subframe belongs to CSI_Subset1, (3) a state in which the subframe belongs to the CSI_Subset2, and (4) a state in which the subframe does not belong to any one of (1) to (3). Such four states may be represented by subframe measurement types. The present invention proposes a method of dividing subframes into four states in consideration of subframe properties and signaling information about each subframe measurement type using 2 bits. This is shown in Tables 2 and 3.

|  | CSI_Subset 1 | CSI_Subset 2 | RRM/RLM_Subset | Complementary subset |
|---|---|---|---|---|
| State 0 | ✓ |  | ✓ |  |
| State 1 | ✓ |  |  |  |
| State 2 |  | ✓ |  |  |
| State 3 |  |  |  | ✓ |

In association with table 2, 2-bit information indicating each subframe measurement type may be configured as shown in Table 3.

| Bit value | State | Subframe setting |
|---|---|---|
| "00" | State 0 | CSI_Subset1 & RRM/RLM_Subset |
| "01" | State 1 | CSI_Subset1 |
| "10" | State 2 | CSI_Subset2 |
| "11" | State 3 | Complementary_Subset |

In Tables 2 and 3, the complementary subset includes subframes which do not belong to either CSI_Subset1 or CSI_Subset2 and do not belong to the RRM/RLM_Subset. As shown in Tables 2 and 3, if each subframe measurement type is expressed by 2 bits, only 80 bits are required to express subframe patterns signaled in units of 40 ms. As shown in Table 1, it is possible to remarkably reduce signaling overhead as compared to the case in which subframe setting is signaled using 120 bits.

The terminal may be aware of each subframe measurement type through bitmap information having a size of 80 bits, which is signaled from the base station, and may perform measurement according to type. For example, if information indicating the measurement type of a certain subframe has a value of "00", the terminal may perform RRM/RLM measurement in the subframe while performing CSI measurement (e.g., computation/generation of an RI, a PMI and a CQI on the assumption that interference from the cell which causes interference is low) corresponding to CSI_Subset1 in the subframe.

Mapping of the combination of measurement subsets, the state and the bit value of Tables 2 and 3 is merely exemplary and the scope of the present invention includes various modified examples in which subframe measurement types are distinguishably defined and are sent through a bitmap having a reduced bit size using information having a predetermined bit size. For example, if CSI_Subset2 and RRM/RLM_Subset have similar channel and interference properties, these subsets may be combined and represented by one state of the subset measurement type. Alternatively, in Tables 2 and 3, states 0, 1, 2 and 3 may be mapped to complementary subset, CSI_Subset2, CSI_Subset1 and CSI_Subset1 & RRM/RLM_Subset, respectively. Alternatively, states 0, 1, 2 and 3 may be mapped to bit values "11", "10", "01" and "00", respectively.

Additionally, information about the RRM/RLM_Subset of information indicating the subframe measurement type may be separately signaled. In this case, as shown in Table 4, the subframe measurement type may be signaled.

TABLE 4

| Bit value | State | Subframe setting |
|---|---|---|
| "00" | State 0 | reserved |
| "01" | State 1 | CSI_Subset1 |
| "10" | State 2 | CSI_Subset2 |
| "11" | State 3 | Complementary_Subset |

As shown in Table 4, the state 0 (or "00") is not defined (instead being reserved) and subframe setting (that is, measurement type) may be signaled using the remaining states 1, 2 and 3. For example, if RRM/RLM_Subset is separately signaled, CSI_Subset1, CSI_Subset2 and Complementary_Subset may be mapped to "01", "10", and "11", respectively.

Information indicating the subframe measurement type in the above-described examples corresponds to information indicating presence/absence of interference (or severity of interference) from the cell (eNB1) which causes interference in each subframe and thus may be used as information indicating a degree of interference from the cell which causes interference in each subframe in the above-described various embodiments.

As a representative example of the above-described subframe measurement type setting methods, a method of informing, by a base station, a terminal of CSI measurement resource setting information is as follows. The base station may determine first and second subframe sets (or CSI_Subset1 and CSI_Subset2) in which CSI measurement will be performed among a plurality of downlink subframes and transmit information indicating the first and second subframe sets to the terminal, and the terminal may receive information indicating the first and second subframe sets and determine in which subframe CSI measurement is performed. The terminal may perform CSI measurement with respect to each of the first and second subframe sets and transmit the result to the base station, and the base station may receive the CSI measurement result. The subframe belonging to the first subframe set CSI_Subset1 and the subframe belonging to the second subframe set CSI_Subset2 may not overlap. As described above, a subframe which does not belong to either of the first and second subframe sets may be present among the plurality of subframes. If such a base station belongs to a cell which is subject to interference, the first and second subframe sets CSI_Subset1 and CSI_Subset2 may be determined as follows.

In addition, setting information of a subframe in which the cell (eNB1) which causes interference performs silencing (that is, a subframe which is set to an ABS) may be sent from the cell (eNB1) which causes interference to the cell (eNB2) which is subject to interference. Such ABS setting information may include a first bitmap indicating a blank subframe and a non-blank subframe and a second bitmap indicating a subset of blank subframes. The first and second subframe sets CSI_Subset1 and CSI_Subset2 may be determined based on blank subframe setting information. For example, the subframe belonging to the first subframe set may correspond to the subset of blank subframes indicated by the second bitmap, the subframe belonging to the second subframe set may correspond to the non-blank subframe indicated by the first bitmap, and the subframe which does not belong to either of the first and second subframe sets may correspond the blank subframe indicated by the first bitmap.

Details described in the above embodiments of the present invention may be independently applied or two or more embodiments may be simultaneously applied to the above-described inter-cell interference coordination methods. As such, a repeated description is omitted for clarity.

Although a base station is described as a downlink transmission subject and a terminal is described as an uplink transmission subject in the description of the various embodiments of the present invention, the scope of the present invention is not limited thereto. That is, the principle of the present invention described through the various embodiments of the present invention is equally applicable to a relay device functioning as a downlink transmission subject for transmitting a signal to a terminal or functioning as an uplink reception subject for receiving a signal from a terminal or a relay device functioning as an uplink transmission subject for transmitting a signal to a base station or a downlink reception subject for receiving a signal from a base station.

Figure 14:
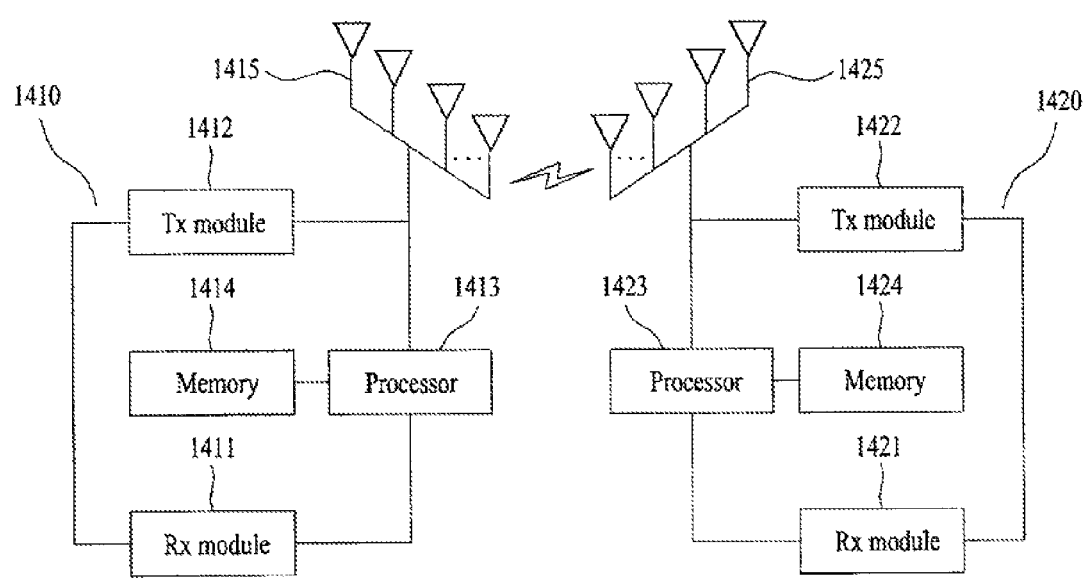
FIG. 14 is a diagram showing a base station (eNB) device and a terminal device according to an exemplary embodiment of the present invention.

FIG. 14 is a diagram showing a base station (eNB) device and a terminal device according to an exemplary embodiment of the present invention.

Referring to FIG. 14, the eNB device 1410 according to the present invention may include a reception module 1411, a transmission module 1412, a processor 1413, a memory 1414, and a plurality of antennas 1415. The plurality of antennas 1415 supports MIMO transmission and reception. The reception module 1411 may receive signals, data, and information from an external device. The transmission module 1412 may transmit signals, data, and information to an external device. The processor 1413 may control the overall operation of the eNB device 1410.

The eNB device 1410 according to the embodiment of the present invention may be configured to transmit CSI measurement resource information. The processor 1413 of the eNB device may be configured to determine first and second subframe sets in which CSI measurement will be performed among a plurality of downlink subframes. In addition, the processor 1413 may be configured to transmit information indicating the first and second subframe sets to the terminal 1420 through the transmission module 1412. The processor 1413 may be configured to receive CSI for the first and second subframe sets from the terminal 1420 through the reception module 1411. Here, the subframe belonging to the first subframe set and the subframe belonging to the second subframe set may not overlap. Some of the plurality of subframes may not belong to either of the first and second subframe sets.

The eNB device 1410 according to another embodiment of the present invention may be configured to transmit load indication information if it belongs to a cell which is subject to interference. The processor 1413 of the eNB device 1410 may be configured to determine a downlink subframe which is required to be set to a blank subframe by a base station of a cell which causes interference among the plurality of downlink subframes. The processor 1413 may be configured to transmit information indicating the determined downlink subframe to the base station of the cell which causes interference through the transmission module 1412.

The eNB device 1410 according to another embodiment of the present invention may be configured to transmit blank subframe setting information if it belongs to a cell which causes interference. The processor 1413 of the eNB device 1410 may be configured to transmit the blank subframe setting information to the base station of a cell which is subject to interference. Such blank subframe setting information includes first and second bitmaps, the first bitmap includes information indicating a blank subframe and a non-blank subframe, and a second bitmap includes information indicating a subset of blank subframes.

The processor 1413 of the eNB device 1410 performs a function for processing information received by the eNB device 1410 and information to be transmitted to an external device. The memory 1414 may store the processed information for a predetermined time and may be replaced with another component such as a buffer (not shown).

Referring to FIG. 14, the terminal device 1420 according to the present invention may include a reception module 1421, a transmission module 1422, a processor 1423, a memory 1424 and a plurality of antennas 1425. The plurality of antennas 1425 supports MIMO transmission and reception. The reception module 1421 may receive signals, data, and information from an eNB. The transmission module 1422 may transmit signals, data, and information to an eNB. The processor 1423 may control the overall operation of the terminal device 1420.

The terminal device 1420 according to the embodiment of the present invention may be configured to perform CSI measurement. The processor 1423 of the terminal device 1420 may be configured to receive information indicating first and second subframe sets in which CSI measurement will be performed among a plurality of downlink subframes from the eNB 1410 through the reception module 1421. The processor 1423 may be configured to perform CSI measurement with respect to each of the first and second subframe sets. The processor 1423 may be configured to transmit CSI to the eNB 1410 through the transmission module 1422. Here, the subframe belonging to the first subframe set and the subframe belonging to the second subframe set may not overlap. Some of the plurality of subframes may not belong to either of the first and second subframe sets.

The processor 1423 of the terminal device 1420 performs a function for processing information received by the terminal device 1420 and information to be transmitted to an external device. The memory 1424 may store the processed information for a predetermined time and may be replaced with another component such as a buffer (not shown).

Details of the above embodiments of the present invention may be independently applied or two or more embodiments may be simultaneously applied to the configurations of the eNB device and the terminal device. A repeated description is omitted for clarity.

A description of the eNB device 1410 of FIG. 14 may be identically applied to a relay device functioning as a downlink transmission subject or an uplink reception subject, and a description of the terminal device 1420 of FIG. 14 may be identically applied to a relay device functioning as a downlink reception subject or an uplink transmission subject.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of setting measurement resources by a first base station, the method comprising:
 receiving, from a second base station, information about setting of a blank subframe of the second base station among a plurality of subframes; and
 setting resources in which a terminal will perform measurement using the information about setting of the blank subframe of the second base station,
 wherein the information about setting of the blank subframe of the second base station includes a bitmap indicating blank subframes and non-blank subframes of the second base station,
 wherein each of the blank subframes of the second base station indicated by the bitmap belongs to any one of a first group or a second group, wherein the first group includes subframes indicated by the information about setting of the blank subframe as belonging to a subset of blank subframes, and wherein the second group includes subframes not indicated by the information about setting of the black subframe as belonging to the subset of blank subframes.

2. The method according to claim 1, wherein the information about setting of the blank subframe further includes another bitmap indicating each of the blank subframes of the second base station as belonging to the first group or the second group.

3. The method according to claim 1, wherein the setting of the resources is performed by using a subset of blank subframes of the second base station indicated by the information about setting of the blank subframe.

4. The method according to claim 1, wherein information about the resources are transmitted to the terminal through radio resource control (RRC) signaling.

5. A first base station of a cell which is subject to interference, which sets measurement resources, the first base station comprising:
    a reception module configured to receive a signal from a second base station of the cell which causes interference;
    a transmission module configured to transmit a signal to the second base station; and
    a processor configured to:
    control the reception module and the transmission module,
    receive, from the second base station, information about setting of a blank subframe of the second base station among a plurality of subframes through the reception module; and
    set resources in which a terminal will perform measurement using the information about setting of the blank subframe of the second base station, wherein the information about setting of the blank subframe of the second base station includes a bitmap indicating blank subframes and non-blank subframes of the second base station, wherein each of the blank subframes of the second base station indicated by the bitmap belongs to any one of a first group or a second group, wherein the first group includes subframes indicated by the information about setting of the blank subframe as belonging to a subset of blank subframes, and wherein the second group includes subframes not indicated by the information about setting of the black subframe as belonging to the subset of blank subframes.

6. The first base station according to claim 5, wherein the information about setting of the blank subframe further includes another bitmap indicating each of the blank subframes of the second base station as belonging to the first group or the second group.

7. The first base station according to claim 5, wherein the setting of the resources is performed by using a subset of blank subframes of the second base station indicated by the information about setting of the blank subframe.

8. The first base station according to claim 5, wherein information about the resources are transmitted to the terminal through radio resource control (RRC) signaling.

* * * * *